(12) United States Patent
Wagner et al.

(10) Patent No.: US 6,241,323 B1
(45) Date of Patent: Jun. 5, 2001

(54) METHOD AND APPARATUS FOR CONTROLLING THE BRAKE SYSTEM OF A VEHICLE

(75) Inventors: Jochen Wagner; Helmut Wiss, both of Moeglingen (DE)

(73) Assignee: Robert Bosch GmbH, Stuttgart (DE)

( * ) Notice: Subject to any disclaimer, the term of this patent is extended or adjusted under 35 U.S.C. 154(b) by 219 days.

(21) Appl. No.: 08/844,016

(22) Filed: Apr. 18, 1997

(30) Foreign Application Priority Data

Apr. 19, 1996 (DE) .............................. 196 15 449

(51) Int. Cl.$^7$ ...................................... B60T 8/32
(52) U.S. Cl. ................... 303/113.4; 303/DIG. 4
(58) Field of Search .................. 303/113.4, 155, 303/DIG. 1–DIG. 4, 10, 11

(56) References Cited

U.S. PATENT DOCUMENTS

| 4,826,255 | * | 5/1989 | Volz | 303/10 |
|---|---|---|---|---|
| 4,892,364 | * | 1/1990 | Burgdorf | 303/113.4 |
| 5,090,780 | * | 2/1992 | Powell | 303/DIG. 3 |
| 5,154,495 | * | 10/1992 | Volz | 303/113.4 |
| 5,236,256 | | 8/1993 | Schmidt et al. | |
| 5,312,172 | * | 5/1994 | Takeuchi | 303/DIG. 2 |
| 5,487,598 | * | 1/1996 | Rivard et al. | 303/DIG. 4 |
| 5,586,814 | | 12/1996 | Steiner | |
| 5,788,337 | * | 8/1998 | Eckert | 303/DIG. 3 |

FOREIGN PATENT DOCUMENTS

| 19501760 | 7/1996 | (DE) | B60T/8/32 |
|---|---|---|---|
| 2303186 | 2/1997 | (GB) | . |
| 2297134 | 7/1997 | (GB) | . |

* cited by examiner

*Primary Examiner*—Matthew C. Graham
(74) *Attorney, Agent, or Firm*—Fulbright & Jaworski, LLP

(57) ABSTRACT

An inlet pressure effected by the driver is detected in the brake system, and a driver's wish value formed from this pressure is used as the basis for controlling the brake system. In the formation of the driver's wish value the measured pressure value is corrected according to control parameters including either status information for a return pump and associated values, or flow information such as volume change in the master cylinder.

13 Claims, 4 Drawing Sheets

METHOD AND APPARATUS FOR CONTROLLING THE BRAKE SYSTEM OF A VEHICLE

BACKGROUND OF THE INVENTION

The invention relates to a method and an apparatus for regulating brake pressure based on the inlet pressure set by the driver.

A method and an apparatus for controlling the brake system of a vehicle is disclosed in the unpublished German Patent Application 1 95 01 760.1 of Jan. 21, 1995. In it the braking force at the wheel brakes is controlled, at least in certain operating conditions, by an active braking force increase or decrease according to the driver's wish. The derivation of the driver's wish from the force applied at the brake pedal would be desirable. In the prior-art system the force applied is determined by measuring the inlet pressure (pressure in the main brake cylinder). This does not coincide in every operating situation with the force actually applied by the foot.

It is the object of the invention to improve the detection of the driver's brake demand by measuring the inlet pressure.

SUMMARY OF THE INVENTION

According to the invention, a brake pressure representing a desired braking action (driver's wish value) is determined based on the measured inlet pressure and additional parameters available for the system. According to a first embodiment these parameters are status information for pressure producing means, such as a return pump, and at least one valve between a main brake cylinder and the inlet or outlet of the pressure producing means. A pressure gradient $dP_{VOR}/dt$ may also be considered. According to a second embodiment the system parameters comprise at least one flow rate in the system, for example the volume change $\Delta V_{HZ}$ in the master cylinder, and the derivative $dP/dv$ at pressure $P_{VOR}$.

The method and apparatus of the invention offers an improved derivation of the driver's wish from the measured inlet pressure in the main brake cylinder of a hydraulic brake system. The more exact detection of the driver's wish improves the operation of the control of the brake system.

It is especially advantageous to undertake a correction of the inlet pressure in accord with the operating states of the valves and pump(s) of the brake system, since particularly the operating state of the pump(s) and of the valves of the brake system has a strong influence on the inlet pressure.

A further improvement of accuracy is achieved by correcting the measured inlet pressure by taking into consideration the volumes flowing through the valves and pump(s) of the brake system.

Especially advantageous is the use of the method and apparatus of invention in the case of a so-called brake aid, in which the braking force in specific situations is intensified dependent upon the driver's braking wish.

Also advantageous is the use of the invention in all of those control systems for brake systems in which the driver's braking wish is detected at least by means of the pressure in the master cylinder of the brake system.

DESCRIPTION OF EMBODIMENTS

Figure 1:
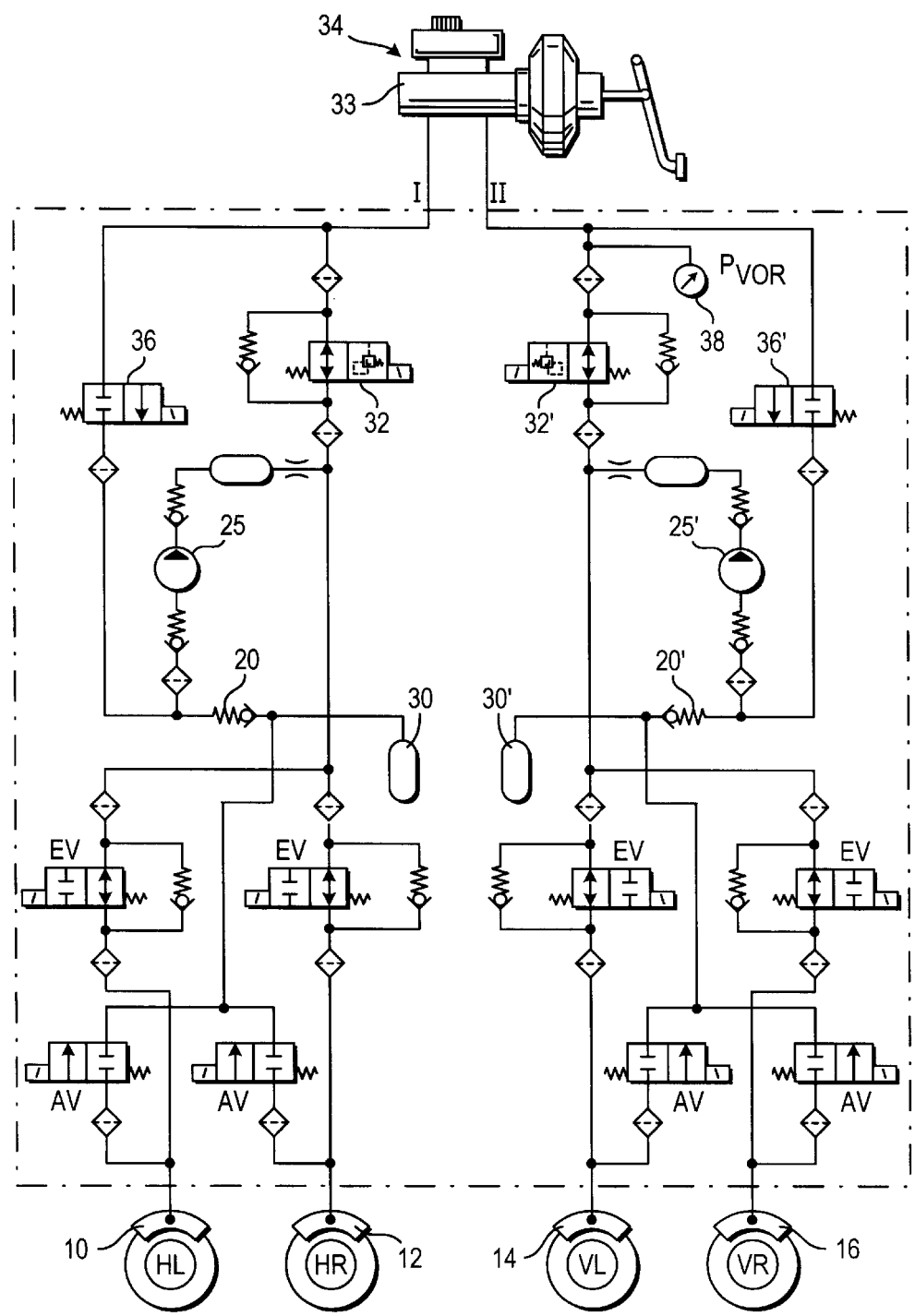
FIG. 1 is a circuit diagram of a brake system in which the method and apparatus of the invention is given preference.

FIG. 1 represents the brake system of a vehicle in a preferred embodiment. The brake cylinder 10 is associated with the left rear wheel, brake cylinder 12 with the right rear wheel, brake cylinder 14 with the left front wheel, and brake cylinder 16 with the right front wheel. The brake system for the rear wheels forms a first brake circuit I, and that of the front wheels a second brake circuit II. Each of the wheel cylinders is in communication with its own outlet valve AV and with its own inlet valve EV. The valves are operated electrically by an electronic control unit represented in FIG. 2. In their working position (activated state) the outlet valves in each brake circuit connect the wheel brake cylinders via non-return valves 20 and 20' to return pumps 25 and 25', respectively, which have a common driver. In their inactive basic state the outlet valves block this connection. Between the outlet valves and the return pump of each brake a low-pressure reservoir 30 and 30' is provided. In their inactive basic position the inlet valves of each brake circuit permit an unhampered flow of hydraulic fluid from the master brake cylinder 33 through a reversing valve 32 and 32' into the wheel brake cylinder. Upon activation the inlet valves block this flow. Also, between the inlet of the return pump 25 and 25' and the brake apparatus 34, a control valve 36 and 36' is installed which in conjunction with the reversing valve 32 and 32' assures the brake pressure build-up independently of the operation of the brake pedal by the driver. Also, at least one pressure sensor 38 is provided near the brake apparatus 34 to detect the inlet pressure $P_{VOR}$ set by the driver.

Normally all solenoid valves are in their basic position. When the brake pedal is operated, pressure is fed through all of the reverse and inlet valves into the wheel brake cylinders. If a tendency to lock is detected in a wheel the corresponding inlet valve is blocked and the outlet valve is operated in such a case. The return pump that is active in this condition draws brake fluid out of the wheel brake cylinders. If an excessive slipping of a wheel is detected, the associated reverse valves and control valves are brought to the active position and the return pump is activated. Thus pressure can be built up in the wheel brake cylinders to slow down the wheel in question. To build up pressure the inlet valve is closed and the outlet valve opened. The evaluation of the wheel speeds is performed by the electronic control unit represented in FIG. 2.

In a preferred embodiment the brake system is operated to increase the braking force in hazardous situations. In such a situation the driver would like to brake the vehicle within the shortest possible distance. Therefore he operates the brake pedal very rapidly. This causes the pressure in the brake lines of the circuit to increase rapidly. If such a brake situation is detected, the pressure build-up in the wheel brake cylinders is actively assisted. For this purpose a very great pressure is built up rapidly in the wheel brake cylinders by operating the reverse valves 32, 32' and control valves 36, 36' and by activating the return pumps 25, 25', and any tendency to lock up is counteracted wheel by wheel. To improve the pumping properties of the return pump and to improve the pressure build-up, the control valve 36 or 36' is opened, so that the return pump or pumps suck fluid directly out of the master brake cylinder. In such a situation the pressure in the wheel brake cylinders increases beyond that applied by the driver.

In other embodiments, as for example in the case of electrohydraulic brakes, the inlet pressure can also be evaluated as the driver's braking wish, according to which the brake pressure in the wheel brake cylinders is controlled in each brake application.

In all cases a very precise detection of the driver's wish is desired in order to distinguish an extraordinary braking situation securely and reliably from normal braking situations and to achieve a precise control of pressure. And so it was found that control actions in the brake system, e.g., the operating state of the pump(s) and/or the position of the valves, especially the reversing valve USV (36, 36') have a strong influence on the inlet pressure measured at the master brake cylinder or in any of the brake lines. The measured inlet pressure is therefore corrected in the brake system according to the control actions in the brake system for the formation of the driver's wish.

At the same time the application of the invention is not limited to the brake system represented by way of example in FIG. 1. It can likewise be applicable in brake systems with a diagonal layout of the brake circuit, in brake systems with a circuit different from that shown in FIG. 1, as long as they have electrically actuable pressure-generating means for building up or reducing pressure in the wheel brake cylinders, or in brake systems in which only one brake circuit is provided with such pressure-generating means.

Figure 2:
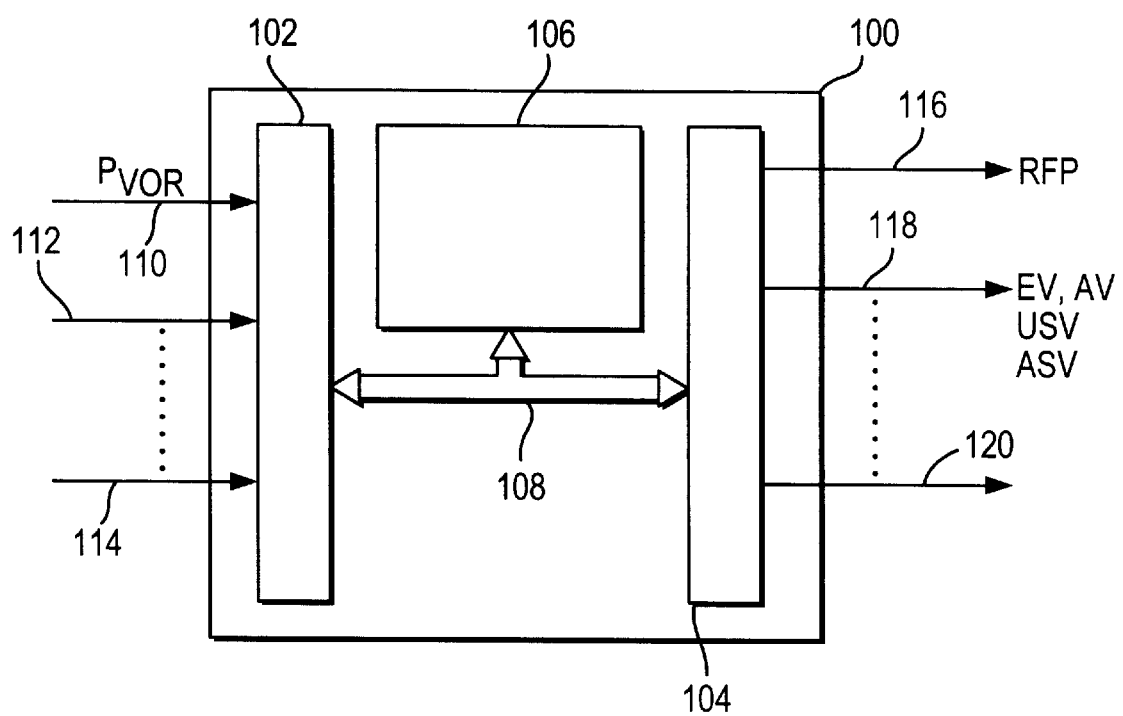
FIG. 2 shows the fundamental structure of an electronic control unit for the control of the brake system.

In FIG. 2 there is shown an electronic control unit 100 which has an input circuit 102, an output circuit 104, and at least one microcomputer 106. The input circuit 102, the output circuit 104 and the at least one microcomputer are connected by a bus system 108 for mutual data and information exchange. The input circuit receives input lines from measuring systems for detecting data from the brake system, the vehicle and/or the driving unit, which in a preferred embodiment are combined in a bus system such as CAN, for example. A first input line 110 feeds data representing the inlet pressure $P_{VOR}$, and additional input lines 112–114 carry data such as wheel speed signals, motor speed, etc. Accordingly, output lines 116 and 118–120 are provided, which serve for controlling the pump(s) and valves.

In the microcomputer 106 programs are implemented which carry out the above-described functions of the brake control in a known manner. Also, programs are installed in microcomputer 106 which perform the process of the invention for determining the driver's braking wish from the inlet pressure. Two embodiments of such programs are outlined by flow diagrams in FIGS. 3 and 4.

In both of the embodiments, the inlet pressure is corrected at least in regard to the influence of the pressure producing means (return pump(s) RFP), for the formation of the driver's wish. If this pressure producing means is active it pumps brake fluid during an active pressure build-up from the master brake cylinder into the brake circuit. Correspondingly, the inlet pressure measured decreases, so that the driver's wish determined from the measured inlet pressure alone is inaccurate. This pressure change made by the pump is determined by an appropriate model or an appropriate estimate. The actual driver's wish $P_{DRIVER}$ then results from the sum of the measured inlet pressure $P_{VOR}$ plus the determined or estimated pressure change. At the same time the pressure change in the master brake cylinder with the driver's foot pressure constant is determined by the change in volume in the master brake cylinder. This depends not only on the activity of the pump(s) but also on the positions of the valves (e.g., USV, ASV) and/or the speed of the pump(s). So the result is the following equation:

$$P_{DRIVER}=P_{VOR}+f(\text{operating state } USV, ASV, RFP) \quad (1)$$

If the brake system has a pressure-producing means for each brake circuit, the effects of the pressure-producing means and control valves of the brake circuits on the measured inlet pressure are cumulative.

In the first embodiment the inlet pressure correction and therefore the driver's wish $P_{DRIVER}$ is estimated as follows. The driver's wish $P_{DRIVER}$ is the result of the sum of the inlet pressure and the inlet pressure correction. The inlet pressure decreases when the pressure-producing means is running, the return valve USV is closed and the control valve ASV is open. In this case the input pressure correction is increased. If the inlet pressure increases by an additional operation of the pedal, for example, then the inlet pressure correction is reduced with a predetermined gradient, although the inlet pressure correction cannot become negative. The computed driver's wish is thus made equal to the measured inlet pressure $P_{VOR}$. In all other cases no correction of the inlet pressure correction is made. This embodiment is represented in the flow diagram in FIG. 3.

Figure 3:
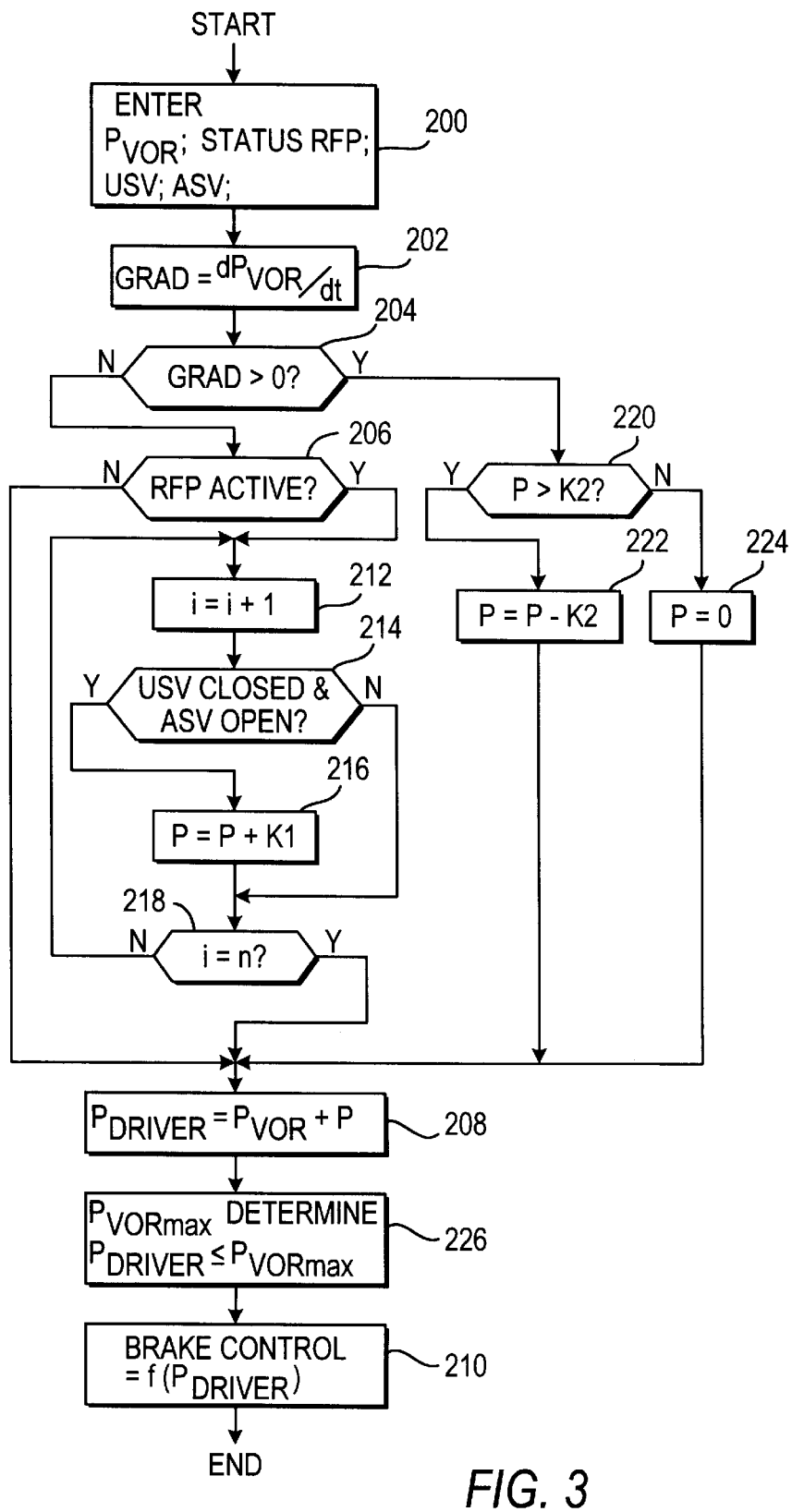
FIG. 3 is a flow diagram illustrating a first embodiment of the method according to the invention.

The program represented by a flow diagram in FIG. 3 is invoked at given time intervals—a few milliseconds for example. In the first step 200 the values important for determining the driver's wish according to the first embodiment are entered. These values are the measured inlet pressure $P_{VOR}$ and the state of operation of the return pump(s) RFP and the reverse valve or valves USV and of the suction valve or valves ASV. In the next step 202 the gradient of the inlet pressure is determined as a time derivative or time change of the inlet pressure signal. In the inquiry step 204 that follows, the object is to find out whether the inlet pressure gradient is positive, i.e., greater than 0. If the gradient is not positive, i.e., if the inlet pressure is unchanged, for example, in determining the driver's wish from the inlet pressure, the control operations in the brake system are taken into account. This is done by means of step 206 in which the object is to find whether the pump(s) is active. If this is not the case, the driver's wish $P_{DRIVER}$ is computed from the sum of the inlet pressure $P_{VOR}$ and the inlet pressure correction P, which describes the pressure change due to the control operations. In the next step 210 the brake control is performed according to the above-described functions depending on the driver's braking wish. After that the program part is terminated and in due time it is repeated.

If it was found in step 206 that the return pump or pumps is or are active, then in the next step 212 of counter i previously set at 0 is incremented. This counter leads to a run-through of each of the following program steps for each brake circuit present, which is equipped with pressure-producing means and control valves for controlling pressure. After step 212, the state of operation of the control valves USV and ASV is checked in step 214. If the valve USV is closed and the valve ASV open, i.e., the return pump delivers fluid from the master brake cylinder, then in step 216 the inlet pressure correction P is increased by the given value K1. If the valves are not in the described state, the return pump pumps no fluid out of the master brake cylinder, so that step 216 is skipped. After step 216, in the case of a "no" response in step 214, a check is made in step 218 as to whether the counter i has reached the maximum n which describes the number of brake circuits with pressure-creating means. If this is not the case, this part of the program is repeated from step 212. Otherwise the driver's braking wish is determined according to step 208.

The inlet pressure correction is limited to a maximum value based on the difference between the maximum inlet pressure and the actual inlet pressure. The driver's wish $P_{DRIVER}$ can thus not become greater than the maximum inlet pressure (see step 226).

When the pump is active, the inlet pressure measured is thus continuously corrected according to the length of the operation of the pressure suction from the master brake cylinder. If step 204 finds that the gradient is positive, i.e., that the inlet pressure is increasing (for example, by the shutting off of the pump by the actuation of the pedal, etc.), P is decreased with a gradient (K2/program cycle time) to zero. In the interrogation step 220 it is asked whether the inlet pressure correction P is greater than a value K2. If it is, then in step 222 the inlet pressure correction P is reduced by the given value K2 and the driver's wish is computed corresponding to step 206. If not, then in step 224 the inlet pressure correction P is set at 0 and the driver's wish is determined according to step 208. In steps 222 and 224, therefore, depending on the conditions present, the driver's wish is adapted with a given gradient to the inlet pressure, if the inlet pressure is lower than the driver's wish and is increasing. The values K1 and K2 are set according to the brake system on the basis of testing, or they result from the periods of actuation of the corresponding valves.

A still more precise determination of the driver's wish is possible in the second embodiment. In this embodiment the estimation of the pressure correction in the master brake cylinder is accomplished by taking into account the variation of the volumetric flows. The volume change in the master brake cylinder $\Delta VHZ$ is given by the suction of volume by the pump $\Delta VRFP$, the volume flowing through the suction valve ASV, $\Delta VASV$, and by the influx of volume through the reverse valve USV, $\Delta Vusv$. If the brake system has a plurality of brake circuits with pressure-producing means, this volume balancing has to be performed in all circuits (1, 2):

$$\Delta VHZ = \Delta VUSV1 + \Delta Vusv2 + MIN(\Delta VRFP, \Delta VASV1) + MIN(\Delta VRFP, \Delta VASv2) \quad (2)$$

The volumes flowing through the valves as well as the volume sucked by the return pump are computed, in the case of the valves, from their open time $\Delta t$ and from the pressure difference $\Delta P$ through the valve, while the volume sucked by the pump is computed in accord with its actuation time $\Delta tRFP$, its speed NRFP and the volume it pumps per stroke VHUB. The following equations result:

$$\Delta VRFP = NRFP \times VHUB \times \Delta tRFP \quad (3)$$

$$\Delta VASV = KASv \times \Delta tASV \times \sqrt{\Delta PASV} \quad (4)$$

$$\Delta Vusv = Kusv \times \Delta tusv \times \sqrt{\Delta Pusv} \quad (5)$$

(Kusv and KAsv are valve-specific constants)

In this manner the volume balance is used to compute the volume change in the master brake cylinder, and the measured input pressure $P_{VOR}$ is corrected to the driver's wish by the following equation, where $dP/dV|P_{VOR}$ stands for the derivative of the brake pressure with respect to the volume of the brake fluid taken at the actual value of $P_{VOR}$:

$$P_{DRIVER} = PVOR + \Delta VHZ \times dP/dV\_OR \quad (6)$$

Figure 4:
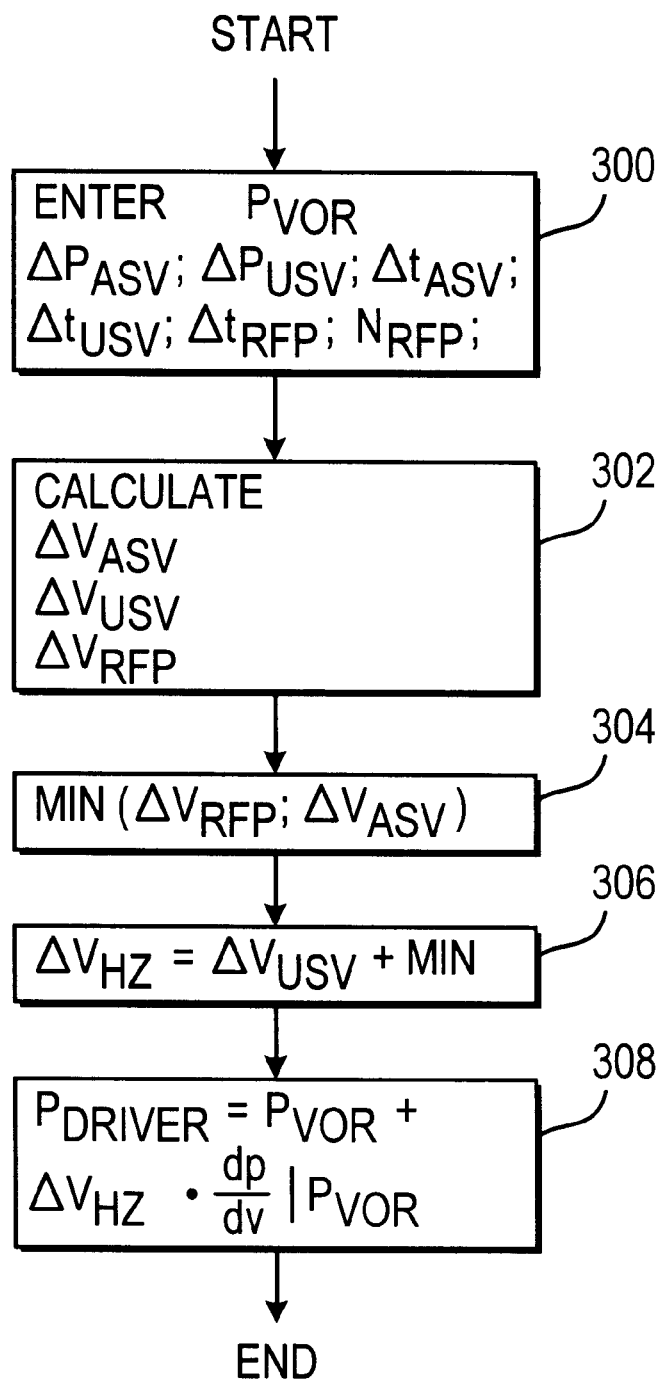
FIG. 4 is a flow diagram illustrating a second embodiment of the method according to the invention.

The corresponding procedure is represented in the flow diagram of FIG. 4. After the program starts at given time intervals, in the first step 300 the factors necessary for computing the correction, $\Delta PASV$, $\Delta Pusv$, $\Delta tASV$, $\Delta tusv$, $\Delta tRFP$ and NRFP are computed for each brake circuit, and the measured signal $P_{VOR}$ of the inlet pressure is entered. In the next step 302, the volume changes $\Delta VASv$, $\Delta Vusv$, and $\Delta VRFP$ are calculated and in the next step 304 the minimum is formed from the volume sucked by the return pump and the volume flowing through the suction valve, for the two brake circuits. In the next step 306, then, the volume change in the master brake cylinder is formed from the sum of the minimum values and the volumes $\Delta Vusv$ flowing through the reverse valve. In the next step 308, the driver's wish $P_{DRIVER}$ is determined by adding the correction value formed according to equation 6 to the measured inlet pressure $P_{VOR}$ and the program is ended and repeated at the given time.

The driver's wish determined in this manner is the basis of the brake control dependent upon the driver's wish.

In some embodiments it can turn out that the correction dependent upon one of the factors (e.g., volumetric flow through ASV and/or USV) is negligible. In this case only the factors determined as relevant are considered for the correction of the measured inlet pressure.

What is claimed is:

1. Method for the control of a brake system of a vehicle, said brake system having a master cylinder and regulating means for regulating brake pressure at the wheels, said method comprising measuring an inlet pressure $P_{VOR}$ set by the driver, determining at least one of the status of means for regulating brake pressure at the wheels and system parameters comprising at least one flow rate in the brake system, said regulating means comprising pressure producing means and valve means, determining a correction value based on at least one of this status and system parameters, determining a driver's wish value based on the measured inlet pressure $P_{VOR}$ and the correction value, and controlling said regulating means in accordance with said driver's wish value.

2. Method according to claim 1, wherein the driver's wish value is determined based on said inlet pressure $P_{VOR}$ and the status of said pressure producing means.

3. Method according to claim 2 wherein the driver's wish value is formed by adding a variable value to the measured pressure value when the pressure-producing means is active.

4. Method according to claim 2 wherein said valve means comprises at least one valve between the main brake cylinder and the pressure-producing means, and the pressure is corrected based on the status of this valve.

5. Method according to claim 4 wherein a correction value of the input pressure is determined only when a valve between the master brake cylinder and an inlet end of the pressure-producing means is open and a valve between the master brake cylinder and an outlet end of the pressure-producing means is closed.

6. Method according to claim 1 wherein the driver's wish value is limited to a maximum input pressure.

7. Method according to claim 1 wherein, in the case of increasing input pressure, the driver's wish is equalized to the measured inlet pressure value with a constant gradient.

8. Method according to claim 1 wherein said at least one flow rate comprises a volumetric flow from the master cylinder, and the driver's wish value is determined from the measured pressure value by estimating the pressure change in the master brake cylinder, based on the volumetric flow.

9. Method according to claim 8, wherein a volume balance is formed for at least one brake circuit, wherein the volume change in the master brake cylinder is determined on the basis of the volumes flowing in and out.

10. Method according to claim 8 wherein the pressure change estimated at the actual pressure is added to the measured pressure value in order to form the driver's wish.

11. Apparatus for the control of a brake system of a vehicle, with an electronic control unit which receives in the brake system at least one signal concerning a pressure influenced by the driver, determines a driver's wish value from this pressure value, in accord with which the control of the brake system is performed, while the electronic control unit determines at least one of the status of means of regulating brake pressure at the wheels and system parameters comprising at least one flow rate in the brake system, determines a correction value based of a least one of this status and system parameters, corrects the measured pressure value according to the correction value.

12. Method for the control of a brake system of a vehicle having wheels, said brake system having regulating means for regulating brake pressure at the wheels, said regulating means comprising pressure producing means and valve means, said method comprising measuring an inlet pressure $P_{VOR}$ set by the driver, determining the status of said regulating means, determining a correction value (P) based on said status, determining a driver's wish value (Pdriver) based on the measured inlet pressure $P_{VOR}$ and the correction value, and controlling said regulating means in accordance with said driver's wish value.

13. Method for the control of a brake system of a vehicle having wheels, said brake system having regulating means for regulating brake pressure at the wheels, said method comprising measuring an inlet pressure $P_{VOR}$ set by the driver, determining system parameters comprising at least one flow rate in the brake system, determining a correction value based on said system parameters, determining a driver's wish value based on the measured inlet pressure $P_{VOR}$ and the correction value, and controlling said regulating means in accordance with said driver's wish value.

* * * * *

UNITED STATES PATENT AND TRADEMARK OFFICE
CERTIFICATE OF CORRECTION

PATENT NO. : 6,241,323 B1
DATED : June 5, 2001
INVENTOR(S) : Wagner et al.

It is certified that error appears in the above-identified patent and that said Letters Patent is hereby corrected as shown below:

<u>Column 5,</u>
Line 62, change "$^P Driver = PVOR +_\Delta VHZ \times dP/dV\_ OR$" to -- $^P Driver = PVOR +_\Delta VHZ \times dP/dV/PVOR$ --.

<u>Column 6,</u>
Line 34, after "one" insert -- parameters --.
Line 35, delete "parameters".

Column 5, lines 31-33, 39 & 40, 46 & 47, 49-53, 62 and 67 to Column 6, lines 1, 3 and 4, change capitalized subscripts.

Signed and Sealed this

Sixth Day of August, 2002

Attest:

JAMES E. ROGAN
Attesting Officer   Director of the United States Patent and Trademark Office